United States Patent
Lunghi

(10) Patent No.: US 6,578,705 B2
(45) Date of Patent: Jun. 17, 2003

(54) RELEASABLE CONVEYOR BELT SYSTEM

(75) Inventor: Don Lunghi, Hillsborough, CA (US)

(73) Assignee: Eldetco, Inc., San Mateo, CA (US)

( * ) Notice: Subject to any disclaimer, the term of this patent is extended or adjusted under 35 U.S.C. 154(b) by 0 days.

(21) Appl. No.: 09/932,788

(22) Filed: Aug. 17, 2001

(65) Prior Publication Data

US 2003/0034233 A1 Feb. 20, 2003

(51) Int. Cl.[7] .............................................. B65G 21/00
(52) U.S. Cl. ................ 198/860.1; 198/813; 198/810.04; 198/835
(58) Field of Search ................ 198/860.1, 810.04, 198/832.1, 835, 860.5, 813–816, 861.1, 626.3, 832, 841

(56) References Cited

U.S. PATENT DOCUMENTS

| | | | |
|---|---|---|---|
| 842,611 A | * | 1/1907 | Bell ........................... 198/835 |
| 1,764,791 A | * | 6/1930 | Ingle .......................... 198/813 |
| 2,007,910 A | * | 7/1935 | Stephens ..................... 193/37 |
| 2,536,412 A | * | 1/1951 | Bamford ...................... 198/835 |
| 2,974,672 A | | 3/1961 | Fox |
| 3,115,236 A | | 12/1963 | Anetsberger |
| 3,430,753 A | | 3/1969 | Strang |
| 3,513,966 A | * | 5/1970 | Eckels .................... 198/810.03 |
| 3,952,861 A | * | 4/1976 | Holmqvist et al. ......... 198/606 |
| 3,993,185 A | * | 11/1976 | Fleckenstein et al. ....... 198/813 |
| 4,142,625 A | | 3/1979 | Bourgeois ................... 198/570 |
| 4,449,958 A | | 5/1984 | Conrad ........................ 474/205 |
| 4,629,062 A | * | 12/1986 | Silverthorn et al. ......... 198/813 |
| 4,899,869 A | * | 2/1990 | Johnson ...................... 198/318 |
| 5,234,302 A | * | 8/1993 | Gawve et al. .............. 198/845 |
| 5,735,389 A | * | 4/1998 | Houzouji et al. ........... 198/597 |
| 6,247,581 B1 | * | 6/2001 | Oswald et al. .............. 198/812 |

* cited by examiner

*Primary Examiner*—Christopher P. Ellis
*Assistant Examiner*—Richard Ridley
(74) *Attorney, Agent, or Firm*—Dergosits & Noah LLP

(57) ABSTRACT

Method and apparatus for quickly and efficiently disassembling a conveyor belt system. The conveyor belt rotates about pulleys which are mounted on a first frame. A drive pulley is mounted on a second frame. When assembled, the drive pulley mounted on the second frame contacts the conveyor belt system causing it to tighten around the pulleys mounted on the first frame. The first and second frames are held together by a quick release mechanism. When the quick release mechanism is released, the first and second frames can be separated and the conveyor belt tension is released and the conveyor belt may be easily removed from the pulleys mounted on the first frame.

20 Claims, 4 Drawing Sheets

RELEASABLE CONVEYOR BELT SYSTEM

FIELD OF INVENTION

This invention is related to conveyor belt systems used to transport objects.

BACKGROUND OF THE INVENTION

A wide variety of powered conveyor systems have been developed for transporting objects. Referring to FIG. 1, a simple conveyor system 100 typically includes a conveyor belt 101, pulleys 103 and a drive mechanism 105. The conveyor belt 101 is mounted on the pulleys 103 and a drive mechanism 105 which rotates one of the pulleys 103 causing the conveyor belt 101 to move. Objects 107 placed on the conveyor belt 101 are transported by the movement of the conveyor belt 101.

It is often necessary to disassemble these conveyor systems for various reasons including equipment maintenance and cleaning. When a component of the conveyor system breaks, disassembly of the conveyor system is required to replace the broken components. Similarly, when the conveyor system is exposed to industrial environments regular disassembly and inspection are necessary as part of a preventative maintenance program. Cleaning of the conveyor system is also required to maintain a sanitary environment for food products which come in contact with the conveyor system. Conveyor system components must be thoroughly cleaned on a regular basis to prevent bacteria, foreign particulates or other contamination from coming in contact with the food products.

The time required to disassemble a conveyor system for cleaning or repairs can result in a loss of production time while the conveyor system is inoperable and a corresponding loss of revenues. What is needed is a conveyor system which is quickly and easily assembled and disassembled.

SUMMARY OF THE INVENTION

The present invention is a conveyor belt system which allows the components to be easily disassembled for maintenance and cleaning. The inventive conveyor belt system includes a free pulley assembly, a drive pulley assembly and a conveyor belt. In the assembled state, the conveyor belt rotates around the free pulley assembly which is held to the drive assembly with releasable fasteners. When the releasable fasteners are released, the drive assembly can be separated from the free pulley assembly and the conveyor belt can be removed from the free pulley frame for cleaning, replacement or maintenance. The drive pulley assembly comprises a drive frame and a drive pulley which transmits force to the conveyor belt. The free pulley assembly includes a pulley frame which holds at least two pulleys about which the conveyer belt moves.

DETAILED DESCRIPTION

Figure 1:
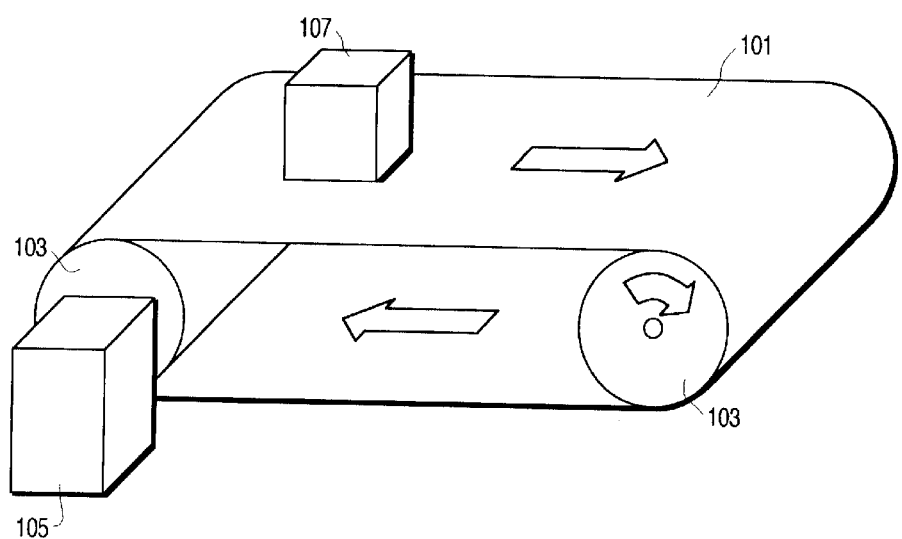
FIG. 1 is a view of a simple conveyor belt system (prior art)

The following is a detailed description of the presently preferred embodiments of the present invention However, the present invention is in no way intended to be limited to the embodiments discussed below or shown in the drawings. Rather, the description and the drawings are merely illustrative of the presently preferred embodiments of the invention.

Figure 2:
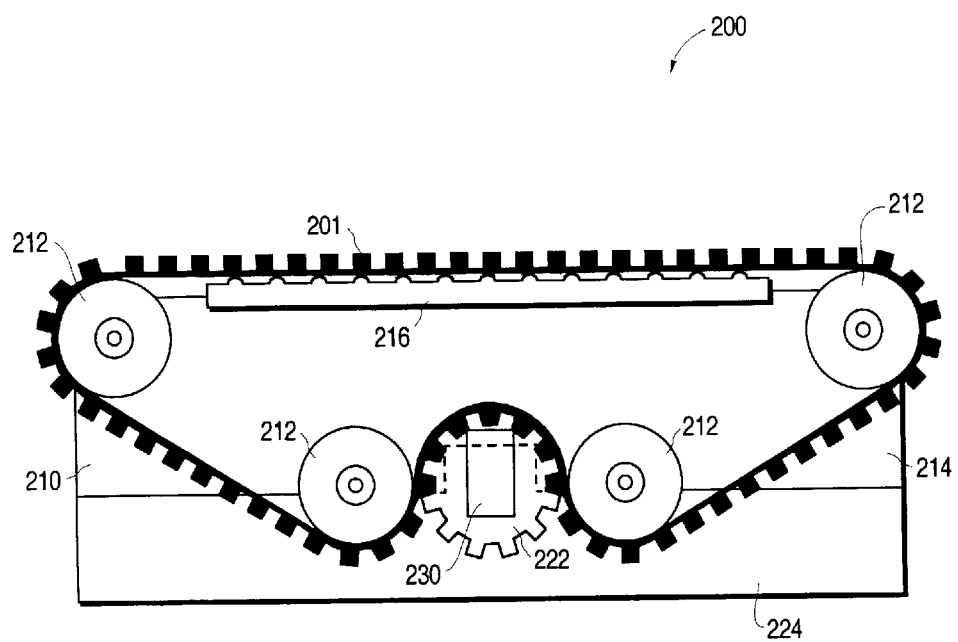
FIG. 2 is a view of the inventive conveyor belt system in the assembled configuration.

The present invention is a conveyor system which allows fast and simple assembly, disassembly and removal of the conveyor belt. FIG. 2 illustrates an embodiment of the inventive conveyor system 200 in the assembled state. A drive pulley 222 is attached to a drive frame 224 and four pulleys 212 are attached to a pulley frame 214. When drive pulley 222 rotates, a force is transmitted to conveyor belt 201 which rotates around four pulleys 212. Objects placed on the conveyor belt 201 are transported.

The pulleys 212 around which the conveyor belt 201 moves are part of a free pulley assembly 210. The pulleys 212 rotate about pulley axles which are mounted substantially parallel to each other on the pulley frame 214. In order to minimize rotational friction, the pulleys 212 may rotate on bearings or bushings mounted on axles. The bearings may be: ball bearings, cartridge bearings, needle bearings or roller bearings or any other suitable type of bearing or bushing. Those of ordinary skill in the art will be able to select the appropriate bearings for the intended application of the conveyor system.

The weight of the object may stretch or deform the conveyor belt 201 reducing its service life. To minimize conveyor belt 201 deformation, a support plate 216 may be mounted on the pulley frame 214 between the upper two pulleys 212 to provide a support surface for objects being transported. To reduce the sliding friction of the conveyor belt 201, the support plate 216 may have a smooth dimpled surface.

In one embodiment of the present invention, the external surface of the conveyor belt 201 has ribs running across its width and the inner surface of conveyor belt 201 is smooth. The drive pulley 222 has a splined surface that mates with the conveyor belt 201 ribs and provides positive traction to drive the conveyor belt 201 around the rotating pulleys 212. The conveyor belt system is configured such that the drive pulley 222 is located between two pulleys 212 so that the conveyor belt 201 contacts a substantial portion of the circumference of the drive pulley 222. With the drive pulley 222 in the assembled position, the conveyor belt 201 is held taut around the pulleys 212 of the pulley assembly 210. In an alternative embodiment the drive pulley 222 and conveyor belt 201 may have other types of surfaces which provide efficient transmission of force between the drive pulley 222 and the conveyor belt 201. A rotational force may be applied to the drive pulley 222 by any suitable means including a motor, gear mechanism, belt system, chain system, pulley system, crank or any other known force transmission device, as well as combinations of these various known techniques.

In an embodiment of the present invention, a releasable fastener 230 holds the pulley frame 214 to the drive frame 224. The pulley frame 214 and the drive frame 224 are designed such that in the assembled configuration, they engage each other so that there is no relative movement the pulley frame 214 and the drive frame 224. The releasable fastener 230 can be: shackles, buckles, screws, snaps, clamps or any other suitable type of releasable fastener mechanism. In an embodiment, the releasable fastener 230 includes two buckles which are mounted on either side of the conveyor belt 201 which are operated by hand and do not require tools to fasten or release. In an alternative embodiment, the releasable fastener 230 may include a tab and slot on one side of the conveyor belt 201 and a single buckle on the opposite side of the conveyor belt 201. The purpose of the releasable fastener 230 is to allow the conveyor system to be quickly and easily assembled or disassembled.

Figure 3:
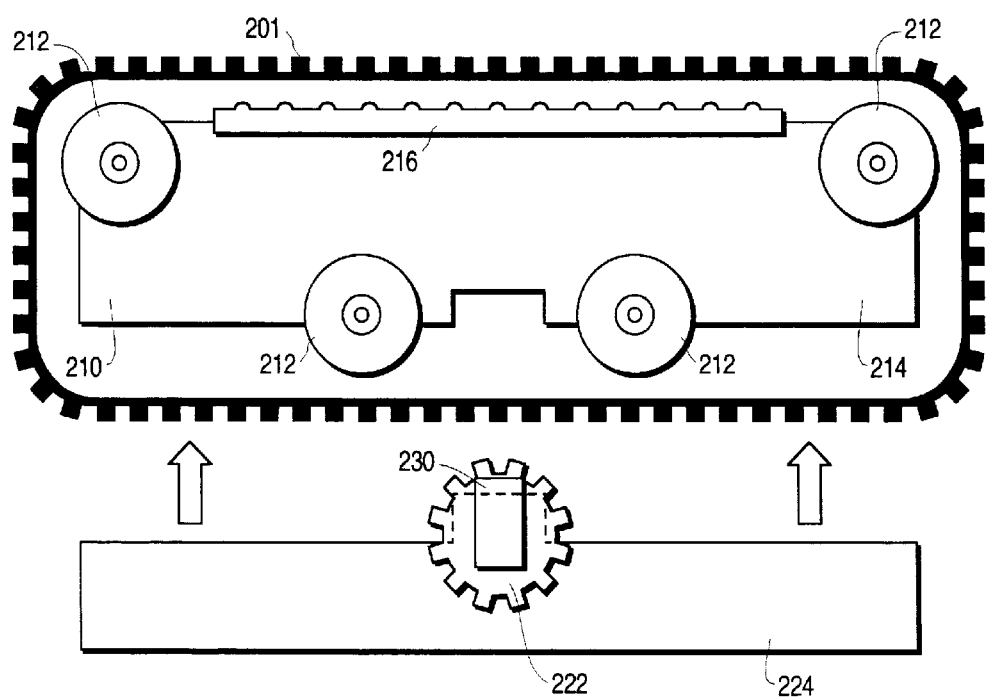
FIG. 3 is a view of the inventive conveyor belt system in the disassembled configuration.

FIG. 3 illustrates an embodiment of the present invention in the disassembled state. When the releasable fastener 230 is released, the pulley frame 214 can be separated from the drive frame 224 and the drive pulley 222 is disconnected from the conveyor belt 201. When the drive pulley 222 is no longer in contact with the conveyor belt 201 tension is released and the conveyor belt 201 can easily be removed from the pulley frame 214 for maintenance and cleaning of components.

In the preferred embodiment, the components of the pulley system 200, other than the conveyor belt 201, are made of stainless steel. Other suitable materials which may be used for the pulley assembly and the drive pulley assembly include: aluminum, steel, and other metals, carbon fiber, aramid fiber and other composite materials, plastics, ceramics, rubber and other materials. The selection of particular materials depends upon the intended application of the conveyor system.

In the preferred embodiment, the conveyor belt 201 is made of a urethane rubber reinforced with polyester cord. Other suitable conveyor belt materials include: rubbers, plastics and other flexible materials. Alternative reinforcement materials for the conveyor belt may be metal or fibrous materials including: polyester, nylon, kevlar, carbon or other suitable materials.

Figure 4:
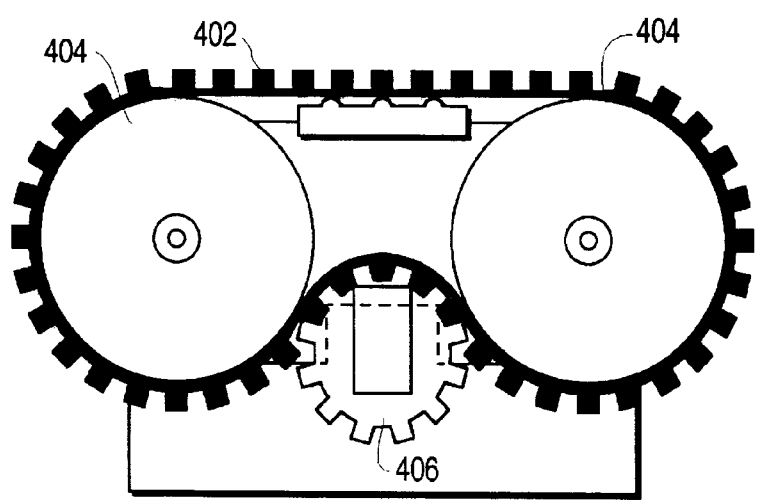
FIG. 4 is an embodiment of the conveyor belt system.

Although the embodiment of the conveyor system described above uses four pulleys and one drive pulley, similar conveyor systems may be configured with different numbers of pulleys. FIG. 4 illustrates an embodiment of the present invention comprising a conveyor belt 402, two pulleys 404 and one drive pulley 406.

In the foregoing, a feeder conveyor belt system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A conveyor belt drive apparatus comprising:
   at least two free pulleys mounted on a first frame;
   a drive pulley mounted on a second frame; and
   a conveyor belt having an inner surface and an outer surface which rotates about the at least two free pulleys and the drive pulley;
   wherein the first frame is releasably engaged to the second frame, the inner surface engages the at least two free pulleys and the outer surface engages the drive pulley.

2. The apparatus of claim 1 wherein:
   the drive pulley tensions the conveyor belt around the free pulleys mounted on the first frame.

3. The apparatus of claim 1 wherein:
   the conveyor belt is made at least partially of rubber.

4. The apparatus of claim 1 wherein:
   the conveyor belt has a ribbed surface; and
   the drive pulley is splined.

5. A conveyor belt drive apparatus comprising:
   at least two free pulleys mounted on a first frame;
   a drive pulley mounted on a second frame; and
   a conveyor belt which rotates about the at least two free pulleys and the drive pulley;
   a plate mounted on the first frame between two of the pulleys, such that in the assembled configuration, the plate is adjacent and substantially parallel to the conveyor belt
   wherein the first frame is releasably engaged to the second frame.

6. The conveyor belt drive apparatus of claim 1 further comprising:
   a releasable fastener which connects the first frame to the second frame.

7. A conveyor belt drive apparatus comprising:
   at least two free pulleys mounted on a first frame;
   a drive pulley mounted on a second frame;
   a conveyor belt which rotates about the at least two free pulleys and the drive pulley; and
   a releasable fastener comprises a buckle or a clamp wherein the first frame is releasably engaged to the second frame.

8. A conveyor belt drive apparatus comprising:
   at least two free pulleys mounted on a first frame;
   a drive pulley mounted on a second frame; and
   a conveyor belt which rotates about the at least two free pulleys and the drive pulley;
   wherein the first frame is releasably engaged to the second frame and the conveyor belt can be removed from the free pulleys mounted on the first frame when the releasable fastener is released and the first frame is separated from the second frame.

9. The conveyor belt drive apparatus of claim 8 wherein the free pulleys are mounted on axles and the first frame engages the ends of the axles.

10. The conveyor belt rive apparatus claim 8 wherein of the free pulleys rotate about the axles on bearings.

11. The conveyor belt drive apparatus of claim 8 wherein:
    the conveyor belt can be removed from the free pulleys mounted on the first frame when the releasable fastener is released and the first frame is separated from the second frame.

12. The conveyor belt drive apparatus of claim 8 wherein the pulleys have cylindrical surfaces.

13. The conveyor belt drive apparatus of claim 8 wherein:
    the conveyor belt has a ribbed surface; and
    the drive pulley is splined.

14. The conveyor belt drive apparatus of claim 5 wherein the surface of the plate is smooth to reduce the friction between the belt and the plate.

15. The conveyor belt drive apparatus of claim 5 wherein the plate has a dimpled surface.

16. The conveyor belt drive apparatus of claim 5 wherein the conveyor belt is in close proximity to the plate wherein when an object is placed on the belt the object is vertically supported by the plate.

17. The conveyor belt drive apparatus of claim 8 wherein the first frame and the second frame are made of stainless steel.

18. The conveyor belt drive apparatus of claim 8 wherein the free pulleys and the drive pulley are made of stainless steel.

19. The conveyor belt drive apparatus of claim 8 wherein the conveyor belt contacts at least 120 degrees of the circumference of the drive pulley.

20. The conveyor belt drive apparatus of claim 19 wherein at least four free pulleys are mounted on the first frame and at least two of the free pulleys are positionedon opposite sides of the drive pulley.

* * * * *